PACKAGING

Original Filed Oct. 6, 1961 3 Sheets-Sheet 1

INVENTORS
James E. DeRemer
Tobias J. Herringshaw
BY John W. Parent
Hanke & Hanke
ATTORNEYS INVENTORS
James E. DeRemer
Tobias J. Herringshaw
BY John W. Parent Hanke + Hanke
ATTORNEYS INVENTORS
James E. De Remer
Tobias J. Herringshaw
BY John W. Parent
Hanke + Hanke
ATTORNEYS United States Patent Office Re. 26,426
Reissued July 16, 1968

26,426
PACKAGING

James E. De Remer, Tobias J. Herringshaw, and John W. Parent, by Continental Aviation and Engineering Corporation, a corporation of Virginia, assignee Original No. 3,237,760, dated Mar. 1, 1966, Ser. No. 383,717, July 20, 1964, which is a division of Ser. No. 143,210, Oct. 5, 1961, now Patent No. 3,204,385, dated Sept. 7, 1965. Application for reissue Apr. 10, 1967, Ser. No. 659,825

8 Claims. (Cl. 206—56)

Matter enclosed in heavy brackets [ ] appears in the original patent but forms no part of this reissue specification; matter printed in italics indicates the additions made by reissue.

*ABSTRACT OF THE DISCLOSURE*

*A package including a cardboard container and a rigid foam material, such as polyurethane, filling the container to encompass the article carried within the package. Several different packages are disclosed including one utilizing a two part container so that the lower part can be filled with the plastic foam first and others in which wires or other separating devices form a part of the package and can be used to remove the article.*

*The present application is a division of copending application Ser. No. 143,210, filed Oct. 5, 1961, and now Patent No. 3,204,385, dated Sept. 7, 1965.*

This invention relates to packaging and particularly to a lightweight, reusable container utilizing a rigid foam plastic which completely encompasses the article being packaged.

In general there are two types of packages in widespread use today for protecting assembled products during shipping. Heavy objects such as aircraft engines are usually packed by being carfully supported inside metal containers which are ultimately shipped back to the manufacturer for reuse. Smaller delicate objects are packed in disposable corrugated cartons with impact protection being provided by some type of loose packing such as strips of paper or by fitted pieces of corrugated cardboard. Each of these methods of packaging has important disadvantages. For instance, metal containers have an initial cost which is high, and small turbine engine containers with which we have particular experience cost well over three hundred dollars. In addition, costs for shipping are high due to the weight of these containers and the engine supports, and if they are to be reused, it often costs as much as one-fifth the original cost to repair and repaint the container each time it is to be reused. Further, metal will deteriorate and thus packages made of it cannot be left exposed for any great length of time.

Corrugated packages are much less expensive than metal containers but they do not have the necessary strength for carrying large and massive objects. In addition, such packages do not have the desired impact resistance for more delicate parts.

It is an object of the present invention to provide a relatively inexpensive package for objects of any size or shape by providing a container which has a low initial cost and which is reusable with negligible rehabilitation cost.

Another object of our invention is to provide a package which is a hermetically sealed enclosure, corrosion resistant, first resistant, impact resistant, vibration dampening, and which will float indefinitely without damage to the packaged article by providing a package which utilizes a rigid plastic foam material, such as polyurethane.

Still another object of the present invention is to minimize shipping costs and handling problems by providing a package which is very lightweight, of small cost and capable of extensive stacking.

Yet another object of the present invention is to reduce the time and labor required in packing and unpacking articles by providing a package which may easily and quickly be packed and unpacked.

Still further objects and advantages will be readily apparent to one skilled in the art upon reference to the following drawings in which like characters refer to like parts throughout the several views and in which FIGURE 1 is a top elevational view of a base section of a preferred embodiment of the present invention showing structure designed to retain the shape of the container during packaging.

Figure 1:
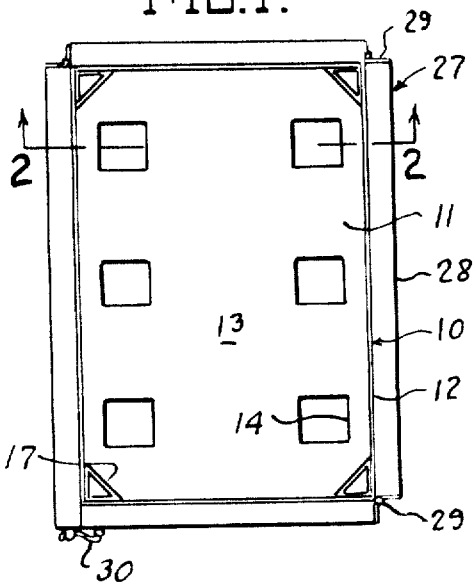

Referring now to the drawings for a more detailed description of our invention, FIG. 1 shows a base section 10 preferably of corrugated cardboard or similar construction such as weatherproof hardboard and having a floor portion 11 and upright walls 12 which define a base enclosure 13. The floor portion 11 is provided with a plurality of square perforations 14 equally spaced to form three lateral rows. Each of the perforations 14 provides communication with the enclosure 13 and the inside of a cardboard cube 15 having turned edges 16 stapled or otherwise fixed to the floor portion 11. The cubes 15 are sufficiently high to provide a standard configuration for fork lifting and stacking. Where fork lift provisions are not required, ordinary containers without integral pallets can be used to reduce the foam usage to a more uniform distribution about the item packaged. Corner posts 17 of cardboard or similar construction are provided at the junctures of the upright walls 12. The corner posts 17 preferably extend somewhat higher than the walls 12.

Figure 3:
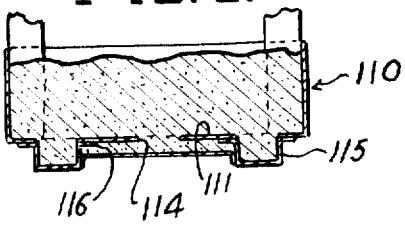
FIG. 3 is a cross-sectional view similar to FIG. 2 but showing a preferred modification of the base section shown there.

Packaging begins by introducing a plastic foam material such as polyurethane into each of the cubes 15 through the perforations 14. The foam material is preferably introduced by spraying and any of the many foaming systems now available may be employed for this purpose. Rigid polyurethane foam is preferred since it hardens into a rigid yet foaming substance. The cubes 15 having been filled with foam, take on the necessary strength needed for trucking and stacking. If even more strength is required for these purposes a modified base section 110 may be used as shown in FIG. 3. In this modification, the floor portion 111 is provided with three rows of square perforations 114 each row of which opens into a hollow rib structure 116, so that when the cubes 115 are filled with rigid polyurethane foam a reinforced base section 110 is produced.

Figure 2:
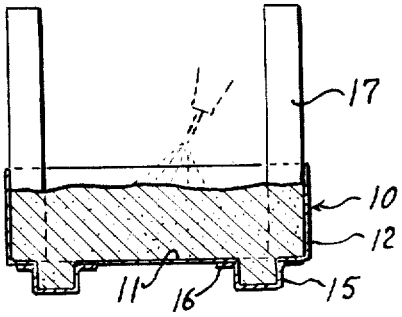
FIG. 2 is a cross-sectional view taken substantially on the line 2—2 of FIG. 1 but with the retaining structure removed.

After this has been completed, the rest of the base section 110 is substantially filled with the foam as shown in FIG. 2. The foam is then allowed to set until the foam has become resilient but before it has reached a stage of rigidity. The exact amount of time for this step depends upon many variables including the mixture employed.

Figure 4:
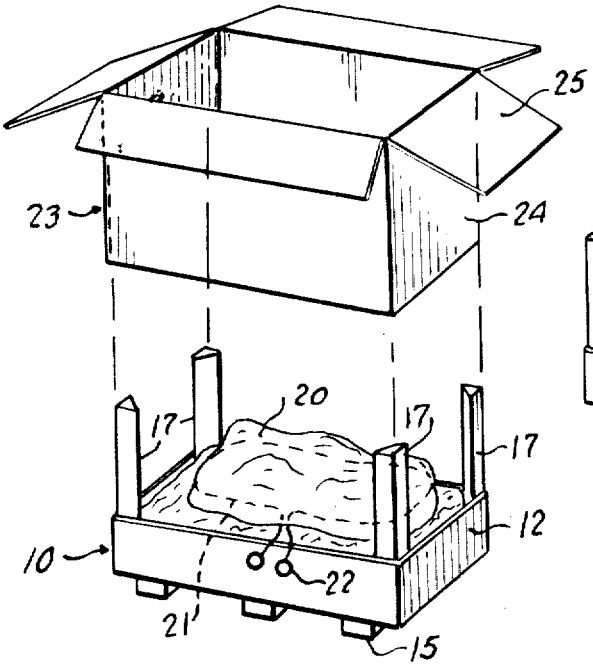
FIG. 4 is an exploded perspective view of an embodiment of the present invention illustrating a step in the packaging of an article.
Figure 8:
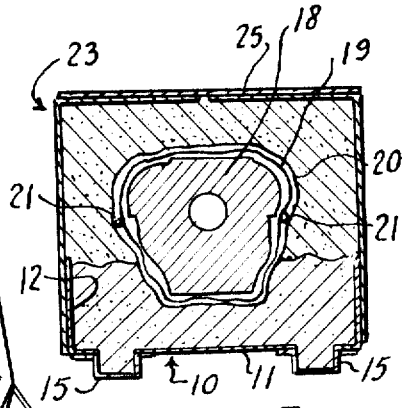
FIG. 8 is a cross-sectional view taken substantially on line 8—8 of FIG. 7.

As best seen in FIG. 8, the article 18 which is to be packaged, in this case a motor, is preperably wrapped in two pieces of heavy paper or similar material. The inside wrapping is designated as 19 and the outside 20. The outside wrapping 20 must in this embodiment of the invention have the characteristics of adhering to the foam and yielding to the cutting action of the wire. The inside wrapping serves to protect the article from foam dust and damage during opening, allow better contouring of the item packaged and provide a base for wire location and various materials are suitable for the purpose. Between these layers of wrapping and completely encircling the article 18 is a thin wire 21 preferably having grasping means 22 on one or both ends located exteriorly of the wrappings 19 and 20. This can best be seen in FIG. 4.

The article 18 including the wrappings 19 and 20 and the wire 21 is placed upon the resilient foam retained in the base section 10. Since the foam has not yet become rigid, it will conform to the configuration of the lower part of the wrapped article 18 and will adhere to the outer wrapper 20.

Figure 6:
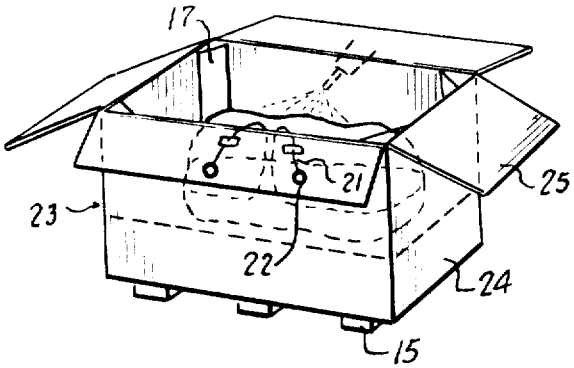
FIG. 6 is a perspective view of the preferred embodiment illustrating another step in the packaging of an article.
Figure 7:
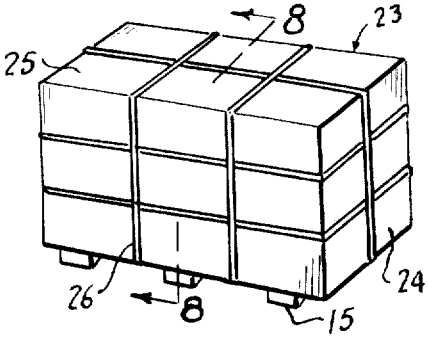
FIG. 7 is a perspective view of the preferred embodiment in completed form.

A top box section 23 is provided with walls 24 each of which has a flap portion 25. The top section 23 is large enough to slide down over the corner posts 17 and the walls 12 and completely cover these. The interior of the bottom section and the top section 23 and the exterior of the posts 17 are preferably waxed or otherwise coated with a parting agent to prevent the foam plastic from adhering to their surfaces. After the top section 23 has been placed over the base section 10, the grasping means 22 of the wire 21 are taped or otherwise secured to one of the flaps 25 as shown in FIG. 6. The top section 23 is thereupon filled with foam. The flaps 25 are closed and the package is preferably completed by providing retaining bands 26 as shown in FIG. 7.

Where ordinary containers are used a similar procedure of filling and closing is employed.

Where the base section 10 and the top section 23 are constructed of rather thin material or the package is large, a retaining structure 27, as shown in FIG. 1, may be used to prevent the plastic from pushing out the sides of the container while it is hardening. Such a retaining structure 27 preferably comprises a walled structure sufficiently large to enclose the sides of the container. Each wall 28, which may be of a paneled or slotted construction, is provided with a hinged connection 29 between it and its adjacent wall except that one of such junctures is provided with latching means 30. This retaining structure is removed after the foam has hardened and conformed to the inside contours of the box.

The resultant package is suitable for labeling and stenciling. Data carriers can be formed in place at the same time the item is foamed with openings placed so as to be available at the surface of the foam. Weathering characteristics of the final package can be improved by the use of triwall or similar materials or the foam block may be suitably coated with one of the many aavilable colored coatings.

When the package has reached its destination, it may be unpacked by first removing the bands 26 and then opening the flaps 25 exposing the end or ends of the wire 21 which may then be removed by loosening the tape or other fastening means. Since the interior of the top section 23 has been treated with wax or a similar substance, it will be easily lifted or unfolded from the base section 10, exposing a unitary block of rigid plastic encompassing the article 18. This block may be separated into two sections by simply pulling the wire 21 outwardly around the article 18 or where large thicknesses are involved by applying a voltage through the wire which will then be resistance heated (below red heat—approximately 300° F.) and will cut readily through the foam without burning.

Another configuration of value is the attachment of the foam pull wire to a second stripper wire built into the cardboad container so that stripping of the container also cuts through the foam block. In this configuration the foam is allowed to adhere to the container walls and the container and foam block part in halves as a unit.

Figure 9:
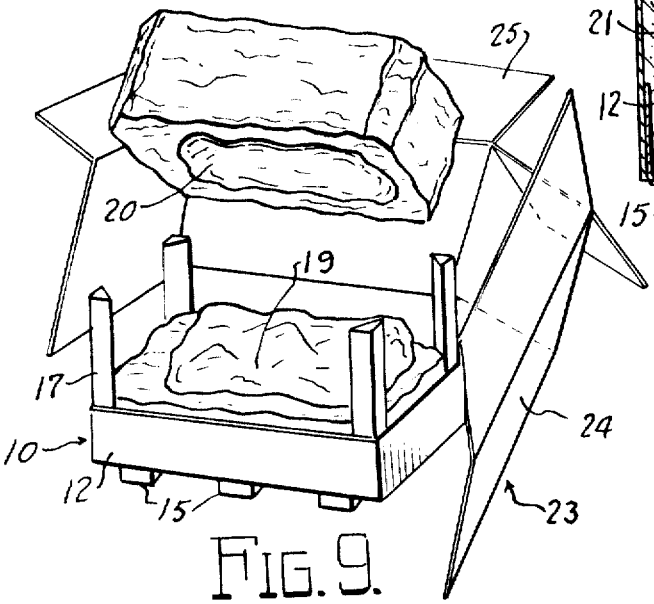
FIG. 9 is an exploded perspective view of the preferred embodiment illustrating a step in unpacking an article.

The outside wrapping 20, since it sticks to the foam, will permit easy removal of the two sections of foam from the article 18 still protected by the inside wrapper 19 as shown in FIG. 9. The impressions left in the two foam sections become paper lined molds into which more articles may be placed for further shipping, being closed either by merely taping the foam cube sections together or reconstituting a hermetic seal by use of various adhesives.

It should be noted that while polyurethane is a strong material in compression, it can be cut quite easily. Thus the pull on wire 21 will not have to be too great. The corner posts 17 act as fill, lessening the amount of foam which must be severed by the wire 21. If more sections are preferred, particularly on very irregularly shaped articles, several pieces of wire 21 may be wrapped about the article 18 as shown in FIG. 5.

Figure 10:
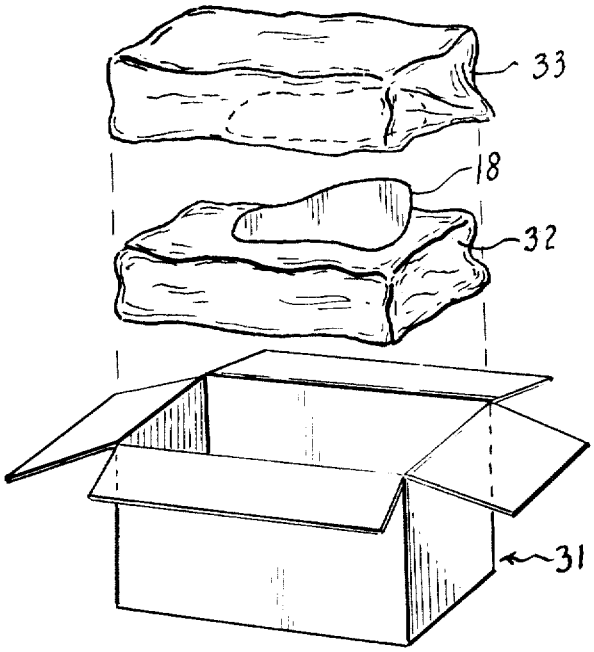
FIG. 10 is an exploded perspective view of another preferred embodiment of the present invention.

FIG. 10 illustrates another preferred embodiment of the present invention utilizing unitary box 31 or corrugated cardboard or similar construction. A polyurethane bag 32 of a size approximately half the volume of the box 31 is placed in the bottom of the box 31. The bag 32 is filled with foam and the article 18 is placed upon this bag of foam 32 before the plastic substance becomes hard. A second polyurethane bag 33 of substantially the same size or smaller, depending on degree of support or padding desired is placed on top of the article 18 and it too is filled with foam before the box 31 is closed. Upon opening after the foam has hardened, the article 18 may be exposed by simply removing the bag 33.

Figure 12:
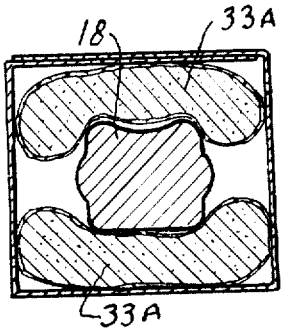
FIG. 12 is a cross-sectional view of a modification of the embodiment shown in FIG. 10.

In FIG. 12, an article 18 is illustrated as merely being supported, rather than being completely encased, by two foam-fiilled polyurethane bags 33A formed in the same way as the bags of FIG. 10.

Figure 5:
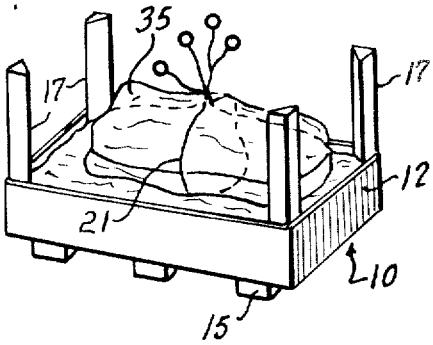
FIG. 5 is a perspective view of a preferred modification of the embodiment shown in FIG. 4.

In FIG. 5, the wires are shown to be wrapped around the outside wrapping 35 of the article, which wrapping consists of a polyethylene bag. When the wires are pulled to cut the foam, the pieces of foam will separate from the polyethylene. The impressions remaining in the foam-filled bags provide a mold into which the article will fit for reusing the container.

Figure 13:
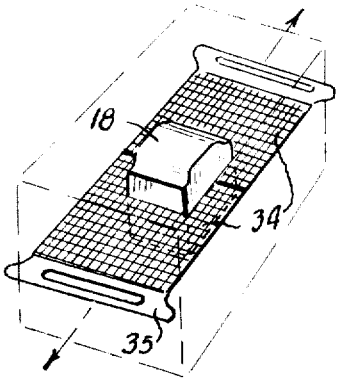
FIG. 13 is a perspective view of the package illustrated in FIG. 11.
Figure 11:
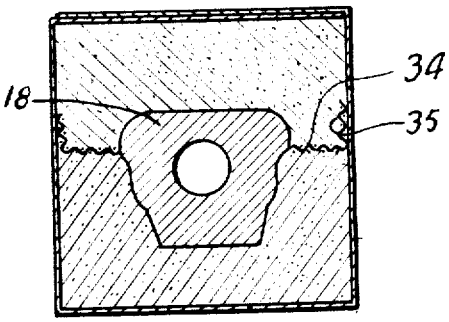
FIG. 11 is a lateral cross-sectional view of still another preferred embodiment of the present invention.

FIGS. 11 and 13 illustrate yet another preferred embodiment of the present invention. A pair of sheets of perforated material 34 such as wire, synthetic screen or even a perforated polyethylene sheet or other material to which the foam will not adhere, is placed in a plane around the article 18 after it has been placed upon the resilient base. The sheet 34 has edges 35 extending outside of the foam package. When the article has been covered by foam, the edges 35 remain outside the foam and provide means whereby the foam block may be separated into two or more sections by simply pulling on these edges 35 as indicated by the arrows of FIG. 13 to slice the foam along the plane of the sheet 34. Variations in number of perforations and adhesion of foam to the sheet material can be employed to control separation forces and vapor barrier characteristics.

It should be noted that the use of a box structure having a separated base section 10 and top section 23 is preferred where large articles are to be packaged since the smaller base enables the bottom to be reached with the necessary equipment for foaming with less difficulty than would be encountered if a unitary box structure like that shown in FIG. 10 were employed.

It is apparent from the foregoing description that our invention provides a package with important advantages not found in containers presently being utilized. The following examples will help illustrate these advantages.

A metal container for packaging a 300 pound aircraft turbine engine costs approximately $340.00. In addition, to this initial cost it costs approximately $70.00 to prepare the package each time it is to be re-used. Because empty it weighs approximately 700 pounds, freight charges to return it for re-use are very high. The foam package of the present invention for this same 300 pound engine would cost only $50.00. It can be prepared for re-use indefinitely by simply supplying a new corrugated outer pack as it deteriorates at a cost of approximately $4.00. Its empty weight is somewhat around 75 to 80 pounds, depending upon the density of the material desired and for this reason, great savings can result in shipping costs both ways.

Further, the foam package of the present invention provides a hermetically sealed container, having extremely high impact resistance and vibration dampening characteristics. Also, due to the properties of the polyurethane foam, the package will float high density items without damage to the packaged article due to the high buoyancy factor. It will not deteriorate if left outside for long periods of time. The insulation and vapor barrier characteristics are extremely high. Finally, it is fire resistant as defined by Government specifications, and self extinguishing since gases generated while burning tend to extinguish the fire.

Corrugated packages have heretofore been used for smaller articles. They generally are not reusable since unpacking normally destroys the package. The initial cost of a foam package is approximately three-fifths that of a similar corrugated package. The foam package can be refitted for reuse for about one-eighth the initial cost. It weighs half that of a similar corrugated package and thus produces a savings over such packages in freight costs. Further, corrugated packages have low impact resistance, no weather resistance, will float only for a short period of time and are readily burned.

Although only several preferred embodiments of the invention have been described, it will be apparent to one skilled in the art to which the invention pertains that various changes and modifications may be made therein without departing from the spirit of the invention or the scope of the appended claims.

We claim:

1. A method of preparing a package for an article comprising: preparing a container having a bottom provided with downwardly extending hollow leg members openly communicating with the interior of the container, and introducing an amount of rigid foaming plastic into said leg members sufficient to fill same whereupon said leg members become supporting pallets for said container.

2. The method of preparing a package as defined in claim 1 and including the subsequent step of introducing into said container after a predetermined interval in which the plastic in the legs has begun solidifying a further quantity of said rigid foaming plastic sufficient to form a base in the bottom of the container in contact with the plastic in said legs.

3. A packaging container comprising a carton having a bottom, and hollow legs disposed on the exterior side of said bottom and openly communicating with the interior of said carton.

4. The container as defined in claim 3 and in which said carton bottom is provided with openings communicating with the interior of said legs.

5. The container as defined in claim 3 and having hollow stiffener members exteriorly of said carton bottom and connecting said legs, the inside of said stiffener members openly communicating with the interior of said carton.

6. The container as defined in claim 3 and having hollow stiffener members exteriorly of said carton bottom and connecting said legs, the inside of said stiffener members openly communicating with the interior of said legs.

7. A packaging means comprising (a) a carton, (b) hollow legs affixed to said carton and having the interior thereof communicating with the interior of said carton, (c) an article to be packaged carried in said carton, (d) a rigid plastic foam in said carton and in the interior of said hollow legs, said rigid plastic foam encasing said article.

8. The packaging means as defined in claim 7 and including a wire disposed intermediate said foam and said article and completely encompassing said article and the ends of said wire extending outwardly through said foam to a point adjacent the interior surface of said carton.

References Cited

The following references, cited by the Examiner, are of record in the patented file of this patent or the original patent.

UNITED STATES PATENTS

| | | | |
|---|---|---|---|
| 2,465,148 | 3/1949 | Coonen | 108—51 |
| 2,956,670 | 10/1960 | Marshall | 206—46 |
| 3,090,331 | 5/1963 | McCann | 108—51 |
| 3,124,246 | 3/1964 | De Remer et al. | 206—56 |

MARTHA L. RICE, *Primary Examiner.*